(12) United States Patent
Gómez Berisso et al.

(10) Patent No.: US 11,835,665 B2
(45) Date of Patent: Dec. 5, 2023

(54) NEUTRON AND GAMMA RADIATION DETECTOR USING A WATER CHERENKOV DETECTOR

(71) Applicants: CONSEJO NACIONAL DE INVESTIGACIONES CIENTÍFICAS Y TÉCNICAS (CONICET), Ciudad Autónoma de Buenos Aires (AR); INIS BIOTECH LLC, Milford Kent County, DE (US); COMISIÓN NACIONAL DE ENERGÍA ATÓMICA (CNEA), Ciudad Autónoma de Buenos Aires (AR)

(72) Inventors: Mariano Gómez Berisso, San Carlos de Bariloche (AR); Juan J. Blostein, San Carlos de Bariloche (AR); José Lipovetzky, San Carlos de Bariloche (AR); Martín Pérez, San Carlos de Bariloche (AR); Iván P. Sidelnik, San Carlos de Bariloche (AR); Miguel F. Sofo Haro, San Carlos de Bariloche (AR); Fabricio P. Alcalde Bessia, San Carlos de Bariloche (AR); Luis H. Arnaldi, San Carlos de Bariloche (AR); Hernán G. Asorey, San Carlos de Bariloche (AR)

(73) Assignees: CONSEJO NACIONAL DE INVESTIGACIONES CIENTÍFICAS Y TÉCNICAS (CONICET), Ciudad Autónoma de Buenos Aires (AR); INIS BIOTECH LLC, Milford Kent County, DE (US); COMISIÓN NACIONAL DE ENERGÍA ATÓMICA (CNEA), Ciudad Autónoma de Buenos Aires (AR)

(*) Notice: Subject to any disclaimer, the term of this patent is extended or adjusted under 35 U.S.C. 154(b) by 0 days.

(21) Appl. No.: 17/429,260

(22) PCT Filed: Feb. 4, 2020

(86) PCT No.: PCT/IB2020/050869
§ 371 (c)(1),
(2) Date: Aug. 6, 2021

(87) PCT Pub. No.: WO2020/161615
PCT Pub. Date: Aug. 13, 2020

(65) Prior Publication Data
US 2022/0011453 A1    Jan. 13, 2022

(30) Foreign Application Priority Data
Feb. 6, 2019 (AR) .............................. 20190100279

(51) Int. Cl.
*G01T 1/22* (2006.01)
*G01T 3/00* (2006.01)

(52) U.S. Cl.
CPC ............... *G01T 1/22* (2013.01); *G01T 3/008* (2013.01)

(58) Field of Classification Search
CPC .................................. G01T 1/22; G01T 3/008
See application file for complete search history.

(56) References Cited

U.S. PATENT DOCUMENTS 3,717,767 A * 2/1973 Gold .................... G01T 1/22
250/361 R
8,373,133 B2 2/2013 Dazeley et al.
(Continued)

OTHER PUBLICATIONS

Ivan Sidelnik et al., "Neutron detection using a water Cherenkov detector with pure water and a single PMT", Nuclear Instruments & Methods in Physics Research, Feb. 16, 2017 (Feb. 16, 2017), Section A, vol. 876, pp. 153-155.
(Continued)

*Primary Examiner* — Marcus H Taningco
(74) *Attorney, Agent, or Firm* — Muncy, Geissler, Olds & Lowe, P.C.

(57) ABSTRACT

A detector of thermal neutrons, fast neutrons and gamma photons that is based on a Cherenkov radiation detector in water and that allows large active volumes of detection at a relatively low cost and higher intensity signals, wherein said detector comprises a container comprising at least a lid; a photon reflective and diffusive coating inside the container; an aqueous solution contained in the container, which com-
(Continued)

prises sodium chloride (NaCl); and a light sensing device optically coupled to the aqueous solution.

15 Claims, 3 Drawing Sheets

(56) References Cited

U.S. PATENT DOCUMENTS

| | | | | |
|---|---|---|---|---|
| 2011/0024639 | A1* | 2/2011 | Dazeley | G01T 1/22 |
| | | | | 250/366 |
| 2013/0168566 | A1* | 7/2013 | Blackburn | G01T 1/22 |
| | | | | 250/391 |
| 2021/0307952 | A1 | 10/2021 | Nielsen | |

OTHER PUBLICATIONS

Sanin: "Nuclear Science Abstracts" In: "Nuclear Science Abstracts", (May 15, 1970), Oak Ridge Directed Operations, Technical Information Division, Abstract No. 16861, May 15, 1970, p. 1673.

Buttram M et al, "Cherenkov Light as a Current Density Diagnostic for Large Area, Repetitively Pulsed Electron Beams", IEEE Transactions on Nuclear Science, IEEE Service Center, New York, NY, US, Aug. 1, 1983, pp. 2216-2218, vol. 34, No. 4.

Verzilov Y et Al: "Development of a new fusion power monitor based on activation of flowing water", Fusion Engineering and Design, Elsevier Science Publishers, Amsterdam, NL, Feb. 1, 2006, pp. 1477-1483, vol. 81, No. 8-14.

\* cited by examiner

NEUTRON AND GAMMA RADIATION DETECTOR USING A WATER CHERENKOV DETECTOR

FIELD OF THE INVENTION

The present invention relates to a detector of thermal neutrons, fast neutrons and gamma photons that is based on a water Cherenkov radiation detector.

BACKGROUND OF THE INVENTION

The detection of thermal neutrons, fast neutrons and gamma photons has various applications such as safety, detecting the presence of fissile or fissionable materials (known as "special nuclear materials", uranium, plutonium, etc.) through the detection of neutrons emitted by these materials. This is of particular interest for the non-intrusive detection of illegal trafficking of special nuclear materials that emit neutrons that can be used for terrorist purposes (uranium, plutonium, etc.), as well as for the detection of illegal transport of radioactive waste in customs and transit sites control, security control in containers, vessels, means of transport, access to facilities, cargo in general and passengers. Other uses may be related to energy in nuclear safeguards (quality control of nuclear fuels), uraniferous exploring and in terms of neutron detection in general for a wide variety of studies of basic and applied interest, including medical applications in the field of nuclear medicine and radiotherapy.

There are neutron detectors that have high efficiencies in the detection of thermal neutrons based on an ionization chamber containing helium-3, a material whose core has a high efficient section of thermal neutron capture and is a noble gas of low isotopic abundance and very low availability on our planet. Currently, the massive use of helium-3 for the manufacture of neutron detectors produced a drastic decrease in the global stock of the helium-3 isotope, a situation known worldwide as the "helium-3 crisis", which caused a significant increase in the price of helium-3 during the last years. This circumstance has made that, in recent years, different laboratories pursue alternative techniques for the detection of neutrons.

One of these alternative techniques to helium-3 based detectors is the use of Cherenkov detectors, in which the neutron and gamma photons are detected indirectly by Cherenkov radiation production.

Devices for detecting neutrons based on Cherenkov detectors have been disclosed, such as U.S. Pat. No. 8,373,133 B2 that protects a neutron and gamma ray detecting device and a radiation portal monitoring system. Said detector consists of a device in which neutron detection is achieved by the use of water doped with gadolinium-containing compounds, more precisely gadolinium chloride ($GdCl_3$), in which the gadolinium nuclei after neutron capture emit gamma photons that, when interacting with the medium by Compton effect, generate electrons with speeds greater than that of light in said medium, thus producing Cherenkov light emission. Said device has a plurality of photomultiplier tubes for capturing light, in addition to a design consisting of two cameras, one on top of the other or one enclosing the other. Said device has some disadvantages, among them, the use of gadolinium chloride which is a salt that is highly expensive and difficult to obtain, in addition to being a toxic substance. Additionally, the use of a plurality of photomultiplier tubes also generates a considerable increase in installation and maintenance cost.

Another patent document related to this field of art is US patent application US 2012/0307952 A1 which is directed to a Cherenkov neutron detector that uses deionized water and $GdCl_3$ as a dopant for neutron detection wherein, after the neutron capture, the emission of beta particles that react with the water is produced, thus producing light by means of the Cherenkov effect, which is captured by one or more photomultiplier tubes or photodiodes. However, despite what is indicated in the application US 2012/0307952 A1, it should be noted that the energy of beta particles emitted by gadolinium is insufficient to produce the Cherenkov effect in water, an effect that has a kinetic energy threshold of 750 keV for electrons. On the other hand, and like the background mentioned above, the doping element for the detection of neutrons, that is, gadolinium chloride, is a toxic compound.

As mentioned for both prior art documents, gadolinium chloride is a polluting and toxic element. This, as specified in its safety data sheet, can cause skin irritation, severe eye irritation and respiratory problems, it is also recommended to avoid breathing it in dust, gas, fog, vapors, among others, causing that, in case of an accidental or intentional breakage of a water Cherenkov device using said dopant, such as at a border crossing, it can lead to a spill that would generate a great environmental cost. Additionally, said data sheet specifies that the use of adequate protective clothing such as safety glasses, gloves, protective masks, etc. is required for the handling this compound.

It should be noted that, in relation to neutron and gamma photon detectors, the technological significance of interest is the absolute detection efficiency, and that for possible applications of neutron and gamma photon detectors, such as scanning/control of large volume samples, the use of large active volume detectors and high intrinsic detection efficiency is convenient.

Consequently, there is a need for a detector that allows to overcome the above-mentioned drawbacks, being able to detect thermal neutrons, fast neutrons and gamma photons through the use of a water Cherenkov detector that uses a non-toxic or non-polluting dopant, of lower cost, with scalability at large detection volumes and that, after neutron capture, produces higher energy gamma radiation that generates a higher intensity signal and allows the use of a simpler and therefore more economical detector.

BRIEF DESCRIPTION OF THE INVENTION

Based on the foregoing considerations, the present invention provides a water Cherenkov detector, which does not use gadolinium salts, which uses fewer resources in electronic devices and which manages to overcome the issues mentioned above, being different from what is known in the field of detectors of thermal neutrons, fast neutrons and gamma photons.

Accordingly, the object of the present invention is a detector of thermal neutrons, fast neutrons and gamma photons that is based on a water Cherenkov radiation detector and that allows detection in large active volumes at a relatively low cost and higher intensity signals, said detector comprising:

a container comprising at least a lid;
a photon reflective and diffusive coating inside the container;
an aqueous solution contained in the container, which comprises sodium chloride (NaCl); and
a light sensing device optically coupled to the aqueous solution.

In a preferred embodiment of the present invention, the material of the container and the at least a lid is independently selected from the group comprising metallic materials, polymeric materials and composite materials.

In a more preferred embodiment of the present invention, the metallic materials are selected from the group comprising carbon steel and stainless steel.

In a more preferred embodiment of the present invention, polymeric materials comprise PVC.

In a more preferred embodiment of the present invention, composite materials comprise fiberglass and epoxy resin.

In a preferred embodiment of the present invention, the container has a geometric shape selected from the group comprising the cylindrical, cubic, parallelepiped shapes having rectangular, spherical base, among others.

In a preferred embodiment of the present invention, the container is external light-tight.

In a preferred embodiment of the present invention, the at least a lid is external light-tight and can be operated between an open position and a closed position.

In one embodiment of the present invention, the light sensing device is selected from the group comprising a photomultiplier tube, a silicon photomultiplier, a CMOS sensor and a CCD sensor, among others.

In a preferred embodiment of the present invention, the aqueous solution comprises between 0.5% and 36% by mass of NaCl, preferably between 2% and 25% by mass of NaCl, more preferably between 3% and 15% by mass of NaCl, even more preferably between 5% and 10% by mass of NaCl, among other intermediate ranges, and most preferably 5% by mass of sodium chloride. The presence of NaCl increases the detection of neutrons by the detector.

In an embodiment of the present invention, the aqueous NaCl solution comprises, in addition, a high refractive index compound such as carbon disulfide ($CS_2$), a material that has a higher refractive index than water, and therefore it has a lower electron energy threshold for producing the Cherenkov effect.

In a preferred embodiment of the present invention, the reflective and diffusive coating used is a white high density polyethylene fabric that reflects and diffuses Cherenkov photons increasing the probability that these photons are detected. Preferably, the high density polyethylene fabric used is marketed under the Tyvek brand by DuPont.

In a preferred embodiment of the present invention, the detector further comprises, inside the container, a plurality of optical fibers coupled to the light sensing device, which improve the capture and transport of the Cherenkov light produced inside the container, which improves the intensity of the recorded signal and the detector efficiency for the neutron and gamma photon detection.

In a preferred embodiment of the present invention, the plurality of optical fibers are coupled to the light sensing device by means of optical grease.

In one embodiment of the present invention, the light sensing device is secured to the at least a lid.

In a preferred embodiment of the present invention, the light sensing device is located outside the container, within another light-tight container or enclosure.

In a more preferred embodiment of the present invention, the plurality of optical fibers are scintillating optical fibers with a wavelength shifter (WLS, for its acronym in English Wavelength Shifters) with multiple coating. These fibers are capable of capturing Cherenkov light and re-emitting light in a greater angular capture range around the transport axis of the fiber, as well as making the light emission spectrum of the optical fiber compatible with the detection efficiency of the light sensor used, further increasing the signal intensity and detector efficiency for detecting neutrons and gamma photons.

In an even more preferred embodiment of the present invention, said plurality of optical fibers comprises seven optical fibers of circular section, being one central and six on its periphery, each 1.25 mm in diameter, placed at the center of the container.

In an even more preferred embodiment of the present invention, the detector of thermal neutrons, fast neutrons and gamma photons comprises:

a container comprising at least an outer light-tight lid that can be operated between an open position and a closed position;

a photon diffusive and reflective coating inside the container;

an aqueous solution contained in the container, which comprises sodium chloride (NaCl) and a high refractive index compound such as carbon disulfide ($CS_2$);

a plurality of optical fibers inside the container; and a light sensing device coupled to the plurality of optical fibers and that is outside the container within another light-tight container or enclosure.

It should be noted that improvements in neutron detection efficiency provided by the use of sodium chloride as a dopant with or without the high refractive index compound (for example, carbon disulfide) and by the use of optical fibers are independent of each other. That is, in an embodiment of the present invention an aqueous solution is used with the addition of sodium chloride but without using optical fibers, while in a preferred embodiment of the present invention the optical fibers and the aqueous solution with sodium chloride as a dopant are incorporated simultaneously since in this way the greater detection efficiency of neutrons and gamma photons is obtained, and the signal intensity of each gamma photon or recorded event is intensified.

Therefore, by means of the Cherenkov detector of the present invention it is possible to overcome the disadvantages of the water Cherenkov detectors known in the art. This is achieved due to the use of an abundant, non-toxic, non-polluting and inexpensive element, such as an aqueous solution of sodium chloride as an active volume in the detector of the present invention; to the use of a single light sensing device optically coupled to the container and to the use of optical fibers that allow increasing the signal intensity of each recorded event and the efficiency in the detection of thermal neutrons, fast neutrons and gamma photons, through a simpler and therefore more inexpensive detector design.

The invention contemplates the use of the high refractive index compound, such as $CS_2$, in the detector of the present invention, which may be diluted in pure water, in the aqueous NaCl solution or just pure.

DETAILED DESCRIPTION OF THE INVENTION

The present invention will be described in greater detail below, with reference to the accompanying figures illustrating embodiments of the invention by way of example, which should not be construed as limiting thereof.

In each of the figures the same numerical references are used for each element of the detector of the present invention.

The present invention relates to a detector capable of detecting thermal neutrons, fast neutrons and gamma photons that is based on a water Cherenkov radiation detector.

For the purposes of the present invention, unless otherwise indicated, the term "aqueous solution" is used interchangeably to refer to an aqueous NaCl solution, an aqueous NaCl solution also containing $CS_2$, or an aqueous solution with only $CS_2$, depending on the context in which it is used.

Likewise, for the purposes of the present invention the expression "light-tight" when used to describe the container, or the lids thereof, of the detector of the present invention refers to the fact that it does not allow the external or ambient light to enter the container, but still it is not shielded to the gammas and neutrons existing in the natural radiation background. On the other hand, the expression "optically coupled", used to describe the way in which the light sensing device is arranged, refers to the fact that said device is positioned so as to receive the greatest amount of Cherenkov photons generated within the container of the present invention. This greater reception of photons by the light sensing device can be achieved, for example, by securing said light sensing device to a container lid and directing it inwards, that is to say towards the aqueous solution; or placing the light sensing device outside the container and housed within another ambient light-tight enclosure.

Figure 1A:
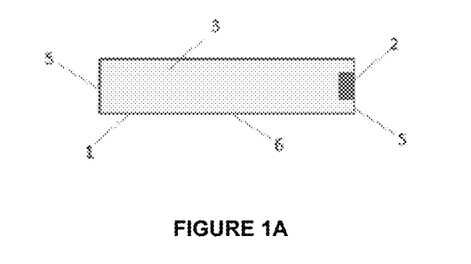
FIG. 1A is a schematic view of an embodiment of the detector of the present invention.

FIG. 1A shows a schematic view of an embodiment of the detector of the present invention comprising a cylindrical container 1, a light sensing device 2, an aqueous NaCl solution 3 constituting the active volume of the container 1, a pair of lids 5 and an inner coating 6.

As can be seen in FIG. 1A, the cylindrical container 1 has the lids 5 placed at each of its ends and contains inside the light sensing device 2, the aqueous solution 3, the inner coating 6.

The cylindrical container 1 is preferably constructed of carbon steel or stainless steel.

The light sensing device 2 is optically coupled to the active volume, being able to minimize reflections at the interface, thus maximizing the number of Cherenkov photons detected. This optical coupling is achieved by avoiding the formation of unwanted volumes (e.g. bubbles), between the aqueous solution 3 and the light sensing device 2, which may have a refractive index different from that of the aqueous solution 3 that could generate unwanted reflections, and therefore Cherenkov light losses. The light sensing device 2 is secured to one of the lids 5 of the cylindrical container 1, facing inwards, that is to say towards the aqueous solution 3, where said lids 5 can be made of the same material as the container 1, are external light-tight, and close the active volume for example by threading, bolting or other type of light-tight closure.

In an embodiment of the present invention, the light sensing device 2 is selected from the group comprising a photomultiplier tube, a silicon photomultiplier, a CMOS sensor and a CCD sensor, among others.

In a preferred embodiment of the present invention, the aqueous solution 3 may comprise ranges between 0.5% and 36% by mass of NaCl, between 2% and 25% by mass of NaCl, between 3% and 15% by mass of NaCl, between 5% and 10% by mass of NaCl, among others. In a more preferred embodiment, the aqueous solution comprises 5% by mass of NaCl which increases the probability of neutron capture in the Cl of NaCl and, therefore, the neutron detection efficiency of the detector.

In an embodiment of the present invention, the aqueous NaCl solution may further comprise a high refractive index compound such as carbon disulfide ($CS_2$), which is used in cases where it is desired to detect radiation consisting of low energy gamma photons.

In a preferred embodiment of the present invention, the inner coating 6 used is a white high density polyethylene fabric that reflects and diffuses Cherenkov photons increasing the probability that these photons are detected. Preferably, the high density polyethylene fabric used is marketed under the Tyvek brand by DuPont. The fabric used has a rough surface that facilitates the propagation of Cherenkov photons because since Cherenkov radiation occurs coherently, a specular reflection would not significantly increase the probability of photon collection and would make the detection of the incident radiation very dependent of the propagation direction. Said fabric is adhered inside the cylindrical container 1 using an adhesive based on transparent commercial silicone, which allows the inner surface of the container 1 to be evenly coated.

The detection of thermal neutrons in the Cherenkov detector of FIG. 1A is achieved when said neutrons, coming from an emitter external to the detector, are captured by the chlorine nuclei of the sodium chloride of the aqueous solution 3, emitting gamma photons. Said photons interact with the aqueous solution by Compton effect, photoelectric effect and/or creation of pairs, thus generating electrons with speeds greater than that of light in said medium, thus exceeding the Cherenkov threshold and thus producing Cherenkov radiation that can be detected using the light sensing device 2 that emits the signal of interest. That is why neutron detection is indirect. Similarly, the detector of the present invention even allows the detection of fast neutrons because the liquid serves as a neutron moderator by converting the fast neutrons into thermal neutrons. For its part, the detection of gamma photons, those coming from outside the detector and those emitted by Cl after neutron capture, is achieved by the interaction between these photons with the solution through photoelectric effects, Compton effects and/or pair creation.

More precisely, after the capture of neutrons by chloride ions when the Cherenkov detector of FIG. 1A is exposed to a neutron emitting radioactive source (not shown), gamma photons are emitted with an energy of 8.5 MeV, which is greater than the energy of the photons emitted after neutron capture by gadolinium in U.S. Pat. No. 8,373,133 B2, making it possible to obtain a higher Cherenkov signal intensity.

It is necessary to explain that the gamma photon with the highest energy emitted after the neutron absorption occurs at $^{155}$Gd is 1.965 MeV, while the gamma photon with the highest energy emitted after the $^{157}$Gd absorbs a neutron is 6.750 MeV. On the other hand, the gamma photon with the highest energy emitted after $^{35}$Cl absorbs a neutron is 8.578 MeV (see "Database of prompt gamma rays from slow neutron capture for elemental analysis") and that the energies reported in the patent mentioned above refer to the total sum of the energy of all the gamma photons produced, so that it cannot be taken into account in the detector of the present invention because not all gamma photons contribute to the signal, either because some gamma photons escape the detector, and/or because one or more particles do not exceed the minimum energy or threshold to be able to generate Cherenkov effect in the water, so the gamma photon of higher energy is taken which is the one that will generate a much higher signal depending on its ability to produce secondary particles inside the detector with enough energy to produce signals, i.e. photons, Cherenkov. Said signal produced by the higher energy gamma photons will produce a greater number of Cherenkov photons than that produced by a lower energy gamma photon and, therefore, will produce a higher intensity signal. The collected signal is processed by performing a spectrum of the signal intensity of the events or photons detected, intensity that is directly proportional to the charge collected in each event. The spectrum consists of a histogram of the intensities of the different recorded events, which are classified into an integer number of discrete channels. "Channel" means the horizontal axis of said histogram, while the vertical axis of the histogram reports the number of events recorded on each channel. Thus, each channel corresponds to a certain range of signal intensities. Therefore, events are recorded on larger channels as the signal intensity increases. Thus, in the spectrum of the charge of detected events, these events of greater intensity will be recorded in channels larger than those produced by lower energy gamma photons. These events of greater intensity are recorded in channels in which the noise due to the natural radiation background and due to the electronic noise is significantly lower, thus improving the signal-to-noise ratio of the detector.

Figure 1B:
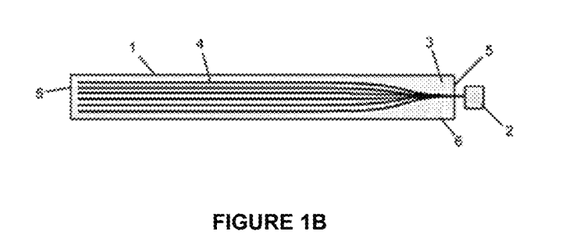
FIG. 1B is a schematic view of a more preferred embodiment of the detector of the present invention.

FIG. 1B shows a schematic view of a more preferred embodiment of the detector of the present invention with a configuration substantially similar to that of FIG. 1A but with the addition of a plurality of optical fibers 4 inside, within the aqueous sodium chloride solution 3 and coupled to the light sensing device 2, in order to improve the neutron detection efficiency of the detector.

The operation of said detector is substantially the same as described above with respect to the detector of FIG. 1A, with the exception that once Cherenkov photons are produced within the aqueous solution 3, they will be collected, formed into wavelength and transported to the light sensing device 2 through the plurality of optical fibers 4. Said light sensing device 2, for this embodiment, may be housed outside the container 1, as shown in FIG. 1B, within another light-tight container or enclosure (not shown) or may also be inside the container 1 secured to a lid 5 of the container 1 and optically coupled to the aqueous solution 3 as in FIG. 1A. The optical coupling between the plurality of optical fibers 4 and the light sensing device 2 is carried out using optical grease, a material that has a refractive index similar to the refractive index of the plurality of optical fibers 4, thus avoiding the unwanted reflections of light that will occur in the air interface that would exist between the plurality of optical fibers 4 and the light sensing device 2 if optical grease were not used to fill this interface.

In a preferred embodiment, the plurality of optical fibers 4 are scintillating optical fibers with multi-coated wavelength shifter (WLS), in order to improve the neutron detection efficiency of said detector.

In an even more preferred embodiment of the present invention, said plurality of optical fibers 4 comprises seven optical fibers having circular section, one central and six on its periphery, each 1.25 mm in diameter, placed at the center of the container.

When using WLS optical fibers, Cherenkov light (mostly emitted in the region from the near ultraviolet to the blue of the visible spectrum) that interacts with that fiber is retransmitted (mostly in the green of the visible spectrum) in all directions, leaving an important solid angle of said remission covered by the angular range of capture and transport of the WLS optical fiber, which works for said re-emitted photons as a waveguide, thus allowing collecting a significant fraction of the Cherenkov light, re-emitting it in wavelengths in which the light sensing device is more sensitive and transporting it great distances to the light detector with minimal loss of photons.

As will be seen below, the addition of the plurality of optical fibers 4 produces a marked improvement in the efficiency of neutron detection and the intensity of the pulses that constitute the signal detected by the detector.

Figure 1C:
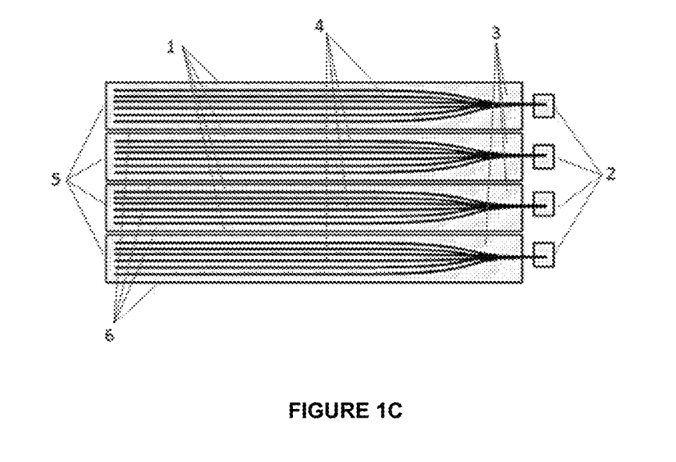
FIG. 1C is a schematic view of another embodiment of the detector of FIG. 1B.

FIG. 1C shows another embodiment of the detector of FIG. 1B. Said embodiment consists in the implementation of several detectors corresponding to that of FIG. 1B, with 2, 3, 4, 5 or more of said detectors being available (in FIG. 1C four are shown), wherein the cylindrical containers 1 of each one of said detectors are placed parallel to each other and adjacently. Each cylindrical container 1 has a light sensing device 2 at one of its ends, independent of each other, which, as in the embodiment of FIG. 1B, can be inside the container 1 or outside it within another light-tight container (not shown), and that allow detecting the presence of neutrons and gamma photons of each aqueous solution 3 independently. This implementation allows different aqueous solutions 3 to be doped with different neutron and/or gamma photons absorbers, thus allowing differentiating the neutron contribution to the signal from the gamma photon contribution.

EXPERIMENTAL EXAMPLES

Figure 2A:
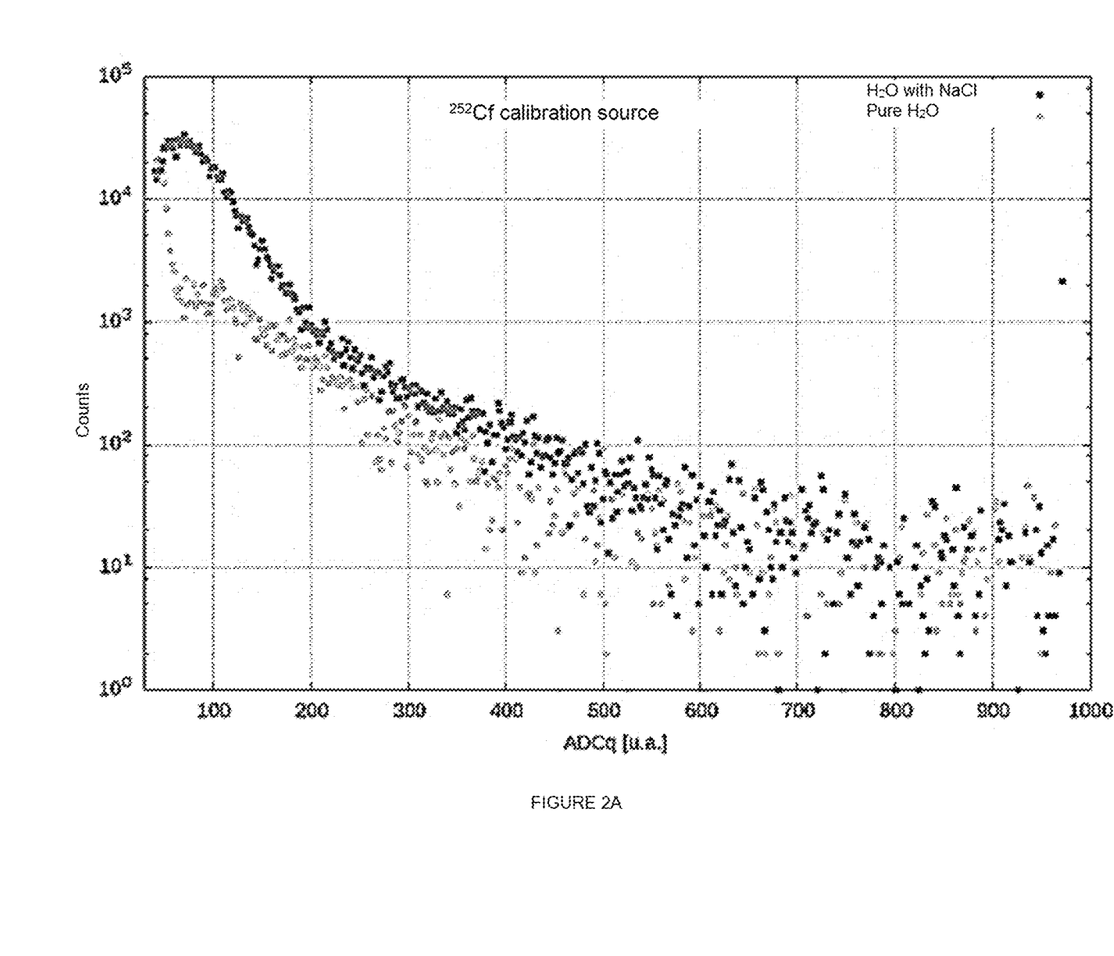
FIG. 2A is a graph showing the response of the detector of FIG. 1A when exposed to a neutron-emitting $^{252}Cf$ source.

FIG. 2A is a graph showing experimental results of the detector of FIG. 1A when exposed to a neutron emitting source. It compares the spectrum of integrated charge of the pulses obtained after a 5-minute measurement in the presence of a neutron $^{252}$Cf (Californium) source using pure water ($H_2O$), which is represented on the graph in the form of hollow circles, with the spectrum obtained using water with NaCl diluted at concentration of approximately 25 g/l, that is 2.5% by mass of NaCl, which is represented in the graph in the form of solid squares. In both cases, a spectrum was extracted, which was previously acquired for 5 minutes in the absence of the source, produced by the natural radiation background, thus obtaining the spectrum due only to the neutrons emitted by the source. It should be explained that the detector was not shielded to reduce the counting contribution of neutrons and gammas existing in the natural background.

On the day of the experiment, the emission of fast neutrons from said californium source was $(2.7\pm0.1)\ 10^3$ neutrons per second. Between the source and the detector, a wall built with 10 cm thick lead bricks was placed. A block of lead was also placed under the source to reduce the amount of photons that, after interacting with the floor, would reach the detector. Said lead wall between the source and the detector and said lead block under the source made it possible to attenuate almost all the contribution to the spectra due to the gamma radiation emitted by said source.

The distance between the center of the source and the outer surface of the detector was approximately 11 cm.

Figure 2B:
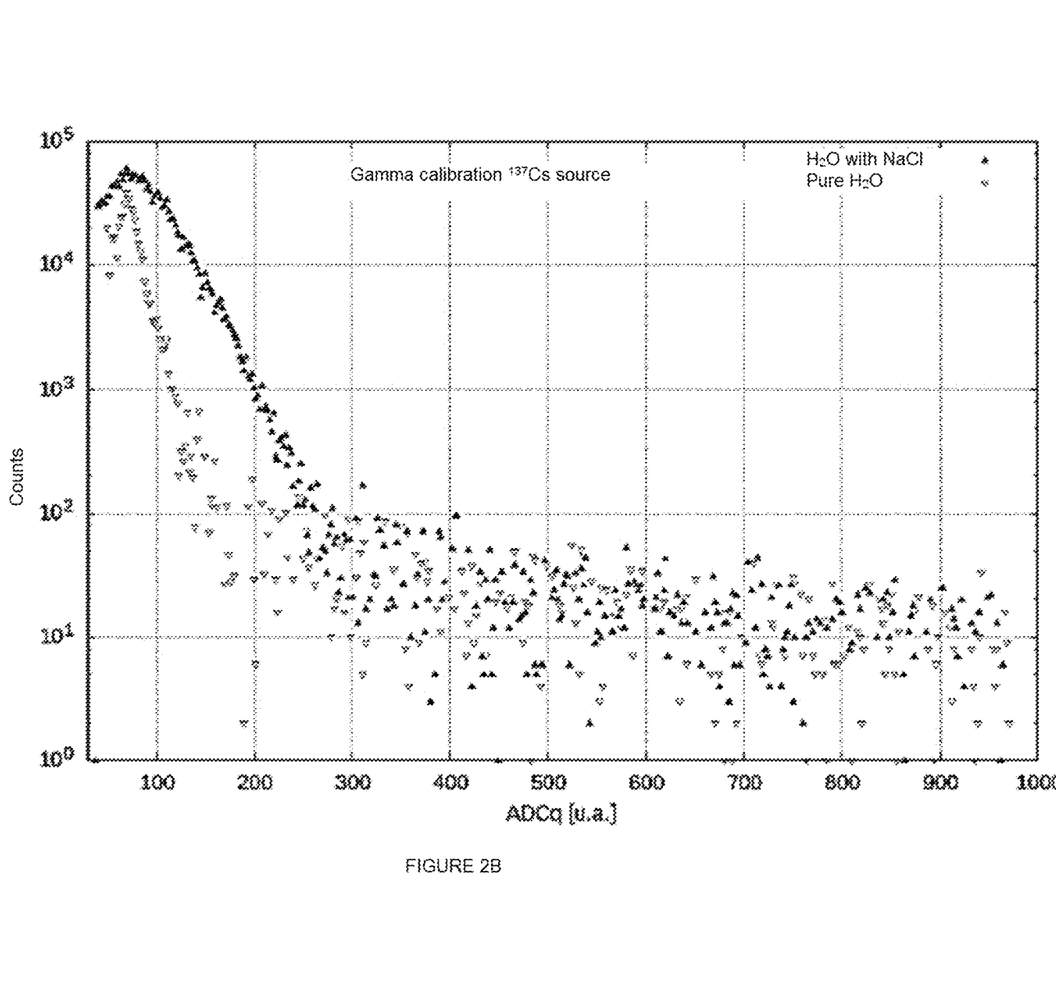
FIG. 2B is a graph showing the response of the detector of FIG. 1A when exposed to a gamma radiation-emitting $^{137}$Cs source.

FIG. 2B is a graph showing experimental results of the detector of FIG. 1A when exposed to a gamma radiation source. It compares the spectrum of integrated charge of the pulses obtained after a 5-minute measurement in the presence of a gamma radiation $^{137}$Cs (Cesium) source using H$_2$O, which is represented on the graph in the form of hollow triangles with the vertex down, with the spectrum obtained using water with NaCl diluted at a concentration of approximately 25 g/l, which is represented on the graph in the form of solid triangles with the vertex up. In both cases a spectrum was extracted, which was previously acquired for 5 minutes in the absence of the source, produced by the natural radiation background, thus obtaining the spectrum due only to the photons emitted by the source.

This source emitted mainly 661.7 keV gamma photons and had an activity of 370.4 Bq (10.01 μCi). In addition, said gamma source was put in contact with the outer surface of the Cherenkov detector. As in the case of the neutron source mentioned above, the center of the gamma source was placed at approximately the same height as the center of the active detection volume (approximately 66.5 cm above the surface on which the detector is supported).

For FIGS. 2A and 2B the horizontal axis of the graph indicates arbitrary units of the digital analog converter used (ADCq, for its acronym in English language) and the vertical axis indicates, in logarithmic scale, the number of events recorded in each channel of pulses of the electronics used to digitize and record the signals.

From FIGS. 2A and 2B it can be seen that the number of events recorded when using NaCl diluted in water is significantly greater than that obtained when using pure water under the same experimental conditions. In the case of neutron detection, this is due to the fact that, after the nuclear reaction with chlorine, numerous gamma photons are emitted, most of which exceed 2.22 MeV, reaching 8.58 MeV. The energy of most of these gamma photons is considerably greater than the energy released after the neutron absorption in H (hydrogen) of H$_2$O (2.22 MeV).

Furthermore, in said FIG. 2A it can be seen that the capture of neutrons in the chlorine of sodium chloride with respect to the capture in the hydrogen of the water not only increases the number of detections but also that said increase occurs predominantly by photons significantly more energetic than the Cherenkov threshold. This increase in the energy of the intermediate gamma photon is shown in an increase in the number of events recorded with a large number of arbitrary units of the digital analog converter. This increase is significantly favorable considering that the background radiation count frequency (which from a point of view of the detection of the materials of interest is noise), decreases significantly and monotonously as the analyzed ADCq channel increases, improving the signal-to-noise ratio by choosing a higher detection threshold.

Table 1 below shows results obtained from the experimental configuration of FIG. 2A. It shows the events recorded in the presence of the natural radiation background and after placing the neutron $^{252}$Cf source. The results are compared using pure water and water with dilute NaCl. The last column indicates the intensity of the signal of interest, obtained by calculating the difference between the events recorded with and without a source.

TABLE 1

Number of events recorded in the presence of the neutron source ($^{252}$Cf) and in the presence of the natural radiation background (background) obtained in a comparative experiment. The difference in recorded events ($^{252}$Cf-background) accounts for the neutrons detected that were emitted by said source:

| Active volume | $^{252}$Cf | Background | $^{252}$Cf-background |
|---|---|---|---|
| H$_2$O | 4,731,330 | 4,503,122 | 228,208 |
| H$_2$O with 25 g/l NaCl | 9,306,656 | 8,243,514 | 1,063,142 |

The first column shows the active volumes that were used in the experiment (H$_2$O and H$_2$O with 25 g/l NaCl), the second column shows the events recorded by the detector after placing the neutron $^{252}$Cf source, the third column shows the events recorded in the presence of the natural radiation background and the last column indicates the intensity of the signal of interest, obtained by calculating the difference between the events recorded with and without a source.

As can be seen in this table, the number of neutrons detected in 5 minutes when using NaCl diluted in water (1,063,142) is considerably greater than the number detected when using pure water (228,208). The addition of 25 g/l of NaCl in the water produced an increase in the counting rate of 365%.

Table 2 below shows results obtained from the experimental configuration of FIG. 2B. It shows the events recorded in the presence of the natural radiation background and after placing the gamma radiation $^{137}$Cs source. The results are compared using pure water and water with dilute NaCl. The last column indicates the intensity of the signal of interest, obtained by calculating the difference between the events recorded with and without a source.

TABLE 2

Number of events recorded in the presence of the gamma radiation source ($^{137}$Cs) and in the presence of the natural radiation background (background) obtained in a comparative experiment. The difference in recorded events ($^{137}$Cs-background) accounts for the gamma photons that were emitted by said source.

| Active volume | $^{137}$Cs | Background | $^{137}$Cs-background |
|---|---|---|---|
| H$_2$O | 11,537,594 | 11,087,238 | 450,356 |
| H$_2$O with 25 g/l NaCl | 10,982,062 | 9,058,152 | 1,923,910 |

The first column shows the active volumes that were used in the experiment (H$_2$O and H$_2$O with 25 g/l NaCl), the second column shows the events recorded by the detector after placing the gamma radiation $^{137}$Cs source, the third column shows the events recorded in the presence of the natural radiation background and the last column indicates the intensity of the signal of interest, obtained by calculating the difference between the events recorded with and without source.

As can be seen in this table, the number of gamma photons detected in 5 minutes when using NaCl diluted in water (1,923,910) is considerably greater than the number detected when using pure water (450,356). The addition of 25 g/l NaCl in the water produced an increase in the counting rate of 327%. This significant improvement in counting demonstrates the advantages of using detectors such as that of FIG. 1A to non-intrusively detect illegal trafficking of special nuclear materials, radioactive waste, etc.

It should be noted that the values reported in Tables 1 and 2 were obtained by integrating the spectra of charges of the recorded pulses of FIGS. 2A and 2B respectively.

Therefore, with the results illustrated in FIGS. 2A and 2B and in Tables 1 and 2, it is experimentally demonstrated that the detector corresponding to FIG. 1A is capable of detecting the neutrons emitted by a $^{252}$Cf source, as well as the gamma photons emitted by a $^{137}$Cs source.

Next, Table 3 is presented showing different neutron detection efficiencies. Two tests consisting of numerical simulations were carried out, considering in each of them the detector of the present invention, having in the first case an aqueous solution with sodium chloride and without a plurality of optical fibers, configuration corresponding to the embodiment of FIG. 1A; and, in the second case, an aqueous solution with sodium chloride and with the plurality of optical fibers, configuration corresponding to the embodiment of FIG. 1B. Each of the efficiencies obtained in these tests is shown with its corresponding statistical uncertainty.

While a concentration of 2.5% by mass of NaCl produces a noticeable difference, a concentration of at least 5% by mass of NaCl is recommended since it is the concentration value at which the chances of neutron capture in the H of the $H_2O$ and Cl of the NaCl are matched.

TABLE 3

Intrinsic neutron detection efficiency of a comparative experiment:

| NaCl saline solution (5% by weight) | NaCl saline solution (5% by weight) with fiber optic bundle |
|---|---|
| (30.7 +/− 6.4) % | (46.6 +/− 7.2) % |

The first column shows the neutron detection efficiency of the detector having only an aqueous solution with sodium chloride and the second column shows the neutron detection efficiency of the detector having an aqueous solution with sodium chloride and a plurality of optical fibers.

In the case where the plurality of optical fibers is used, it consists of seven WLS optical fibers with a diameter of 1.25 mm, one central and six on its periphery, placed at the center of the container.

In this test $10^5$ neutrons were injected, with energies between $10^{-8}$ MeV (thermal neutrons) and 2 MeV (fast neutrons) being incident on the center of the container in the direction normal to its longitudinal axis. Twenty embodiments of this procedure were performed in order to minimize the fluctuations introduced by the intrinsic randomness of tests. The detection efficiency was calculated as the ratio between the number of events detected by the detector and the number of incident neutrons.

As shown above, the addition of the plurality of optical fibers into the active volume (in order to collect, to form wavelength and to transport Cherenkov photons generated within the liquid) markedly improves detection efficiency of neutrons and the intensity of the pulses that constitute the signal detected by the detector.

It is necessary to highlight the advantages obtained with the detector of the present invention, which were not in any way evident or expected, the advantages regarding the facts that the aqueous solution volume considered may be sufficient to efficiently collect the gamma photons generated within said solution; that said solution may generate enough Cherenkov light to form a signal measurable over the electronic noise existing in the experimental detector; that the addition of sodium chloride (in a quantity sufficient to dominate the neutron absorption over water) may not significantly affect the transparency of the solution in the wavelength range of the Cherenkov light in which the light sensing device (for example, a photomultiplier tube) has an important quantum efficiency; and, finally, that the incorporation of optical fibers may produce a sufficient collection, formation of wavelength and transport of the re-issued light.

The invention claimed is:

1. A detector of thermal neutrons, fast neutrons and gamma photons, comprising:
    a container comprising at least one lid;
    a photon reflective and diffusive coating inside the container;
    an aqueous solution contained in the container, comprising sodium chloride (NaCl); and
    a light sensing device optically coupled to the aqueous solution,
    wherein the aqueous solution comprises between 5% and 10% by mass of NaCl; and
    wherein the detector further comprises, inside the container, a plurality of optical fibers coupled to the light sensing device.

2. The detector according to claim 1, wherein a material of the container and the at least one lid is independently selected from the group comprising metallic materials, polymeric materials and composite materials.

3. The detector according to claim 1, wherein the container has a geometric shape selected from the group comprising cylindrical, cubic, parallelepiped shapes having rectangular and spherical base.

4. The detector according to claim 1, wherein the container is external light-tight.

5. The detector according to claim 1, wherein the at least one lid is external light-tight and can be operated between an open position and a closed position.

6. The detector according to claim 1, wherein the light sensing device is selected from the group comprising a photomultiplier tube, a silicon photomultiplier, a CMOS sensor and a CCD sensor.

7. The detector according to claim 1, wherein the aqueous solution comprises 5% by mass of NaCl.

8. The detector according to claim 1, wherein the aqueous solution further comprises a high refractive index compound.

9. The detector according to claim 8, wherein the high refractive index compound is carbon disulfide ($CS_2$).

10. The detector according to claim 1, wherein the photon reflective and diffusive coating is a white high density polyethylene fabric.

11. The detector according to claim 1, wherein the plurality of optical fibers are coupled to the light sensing device by optical grease.

12. The detector according to claim 1, wherein the light sensing device is secured to the at least one lid.

13. The detector according to claim 1, wherein the light sensing device is located outside the container, within another light-tight container or enclosure.

14. The detector according to claim 1, wherein the plurality of optical fibers are Wave-Length shifting optical fibers.

15. The detector according to claim 1, wherein said plurality of optical fibers comprises seven optical fibers having circular section, one central and six on its periphery, of 1.25 mm in diameter each, placed at the center of the container.

* * * * *